United States Patent
Billings

[11] Patent Number: 5,934,900
[45] Date of Patent: Aug. 10, 1999

[54] REFRACTORY NITRIDE, CARBIDE, TERNARY OXIDE, NITRIDE/OXIDE, OXIDE/CARBIDE, OXYCARBIDE, AND OXYNITRIDE MATERIALS AND ARTICLES

[75] Inventor: Garth W. Billings, Santa Rosa, Calif.

[73] Assignee: Integrated Thermal Sciences, Inc., Santa Rosa, Calif.

[21] Appl. No.: 08/823,350

[22] Filed: Mar. 24, 1997

Related U.S. Application Data

[63] Continuation-in-part of application No. 08/623,677, Mar. 29, 1996.

[51] Int. Cl.$^6$ .................................................. B32B 15/04
[52] U.S. Cl. .............................. 432/264; 51/307; 51/309; 432/156; 432/262; 428/469; 428/472; 428/697; 428/658; 428/699; 428/701
[58] Field of Search ..................................... 428/698, 701, 428/469, 472, 697, 699; 51/307, 309; 65/374.13; 432/156, 262, 264

[56] References Cited

U.S. PATENT DOCUMENTS

| | | | |
|---|---|---|---|
| 4,252,862 | 2/1981 | Nishida | 428/457 |
| 4,447,263 | 5/1984 | Sugizawa et al. | 428/698 |
| 4,761,346 | 8/1988 | Naik | 428/627 |
| 4,970,092 | 11/1990 | Gavrilov et al. | 427/37 |
| 5,035,957 | 7/1991 | Bartlett et al. | 428/552 |
| 5,336,280 | 8/1994 | Dubots et al. | 51/293 |

Primary Examiner—Archene Turner
Attorney, Agent, or Firm—Henry P. Sartorio

[57] ABSTRACT

Refractory ceramics and composite materials consisting of nitrides, carbides, mixed carbides and oxides, oxycarbides, mixed nitrides and oxides, and oxynitrides of Group IVB metals Hf, Zr, and Ti, Group IIA metals Be, Mg, Ca, Sr, and Ba, and Group IIIB metals Sc, Y, and lanthanides La through Lu are used to form refractory articles, or as coatings for refractory articles. These materials and articles have high resistance to molten metals, molten salts, erosion, and high temperature corrosive environments, and can be engineered to have desirable thermal and electrical properties. The refractory materials encompass nitrides, carbides, reacted ternary and quaternary oxides, mixed carbides and oxides, oxycarbides, mixed nitrides and oxides, and oxynitrides and have the general chemical formula $M_{x1}M'_{x2}M''_{x3}N_yC_wO_z$ where M is Hf, Zr, or Ti, M' is Be, Mg, Ca, Sr, or Ba, M'' is Sc, Y, and lanthanides La through Lu, N is nitrogen, C is carbon, O is oxygen. In particular, nitrides having at least 54 atomic percent metal, ternary oxides having no more than 66.6 atomic percent oxygen, and oxynitrides having at least 33.4 atomic percent metal are preferred. Substoichiometric GroupIVB-GroupIIA and Group IVB-GroupIIIB ternary oxides are also preferred.

21 Claims, 1 Drawing Sheet

REFRACTORY NITRIDE, CARBIDE, TERNARY OXIDE, NITRIDE/OXIDE, OXIDE/CARBIDE, OXYCARBIDE, AND OXYNITRIDE MATERIALS AND ARTICLES

RELATED APPLICATIONS

This application is a continuation-in-part (CIP) of Ser. No. 08/623,677 filed Mar. 29, 1996, pending.

BACKGROUND OF THE INVENTION

1. Field of the Invention

The present invention relates generally to refractory materials and articles, and their methods of manufacture, and more particularly to refractory materials and articles with high resistance to molten metals, molten salts, and high temperature corrosive environments.

2. Description of Related Art

In many fields there is a need for highly refractory, chemically resistant, and thermodynamically stable materials and articles. Materials and articles with high melting points and with good mechanical and electrical properties are needed for use in thermochemical processing technologies incorporating materials in the form of molten metals, molten salts, reactive gases, and other corrosive chemicals. One particularly important area of application is crucibles, molds, and other containment vessels. Another important area is processing tools like stirring rods, transport tubes, temperature probes, bricks and mortar, and coated structures.

Materials and articles are required which can withstand high operating temperatures and can be exposed to a variety of difficult to handle materials, ranging from reactive metals like Ti, Zr, Hf, V, Nb, Ta, and Be, to lanthanide metals La to Lu, to actinide metals like U and Pu; as well as commonly used aggressive salts like alkali-halides (e.g., NaCl, KCl, LiCl) and alkaline earth-halides (e.g., $CaCl_2$, $CaF_2$). In addition, refractory materials and articles must withstand thermal cycling conditions, i.e., heating and cooling, without spalling or cracking; and must be able to be tailored to be good thermal and electrical conductors or thermal and electrical insulators.

Some of the problems associated with thermochemical processes are the result of high temperatures and very chemically reactive materials used for specific functions in the processes. Molten salts and metals are extremely aggressive at high temperatures and attack the molds or crucibles used to contain them in the processing vessel.

Metals like tungsten and tantalum have been used for crucibles, but the molten salts gradually erode them and molten metals can form alloys or intermetallic compounds with them. When the metals are corroded or no longer useable, they are discarded as waste. Magnesia (MgO) and yttria ($Y_2O_3$) are examples of ceramic materials that have been used for crucibles, but these materials are either wetted by the melts or crack easily from thermal shock or stresses that build up at the interface between the melt and crucible, so they get limited use and are then discarded as waste.

Some coating technologies have yielded promising results, although the materials and architectures produced by these methods have inherent problems as well. Important examples of inherent problems are those associated with protective coatings that are either painted or plasma sprayed on crucibles and molds. These coatings have different thermal and chemical properties than their host; thus, property mismatches cause spalling or cracking of the protective coating, causing contamination of the melt, and allowing the host material to be exposed to the environment and attacked.

In the past, contractors to the US Department of Energy have utilized crucibles and molds painted with beryllia (BeO) and yttria ($Y_2O_3$) for containing reactive metals like beryllium and uranium. These coatings crack and spall into the melts, allowing the molten metals to attack the host, and causing impurities to be trapped in the final metal products. Other technologies widely employed for processing reactive metals are arc-melting, electron-beam melting, and cold-wall induction melting. Under these conditions, the reactive molten metals are frozen, or solidified, quickly at the surface of the containment vessel, and thus are not allowed time to react with the container. However, these processes require large capital investments, are complicated, and have high operating costs. Further, an inherent problem with these technologies is that they do not allow for thorough mixing (or alloying) which may be desired or required for the final properties of the products.

U.S. Pat. No. 5,084,312 to Krikorian et al describes molten metal containment vessels with rare earth or rare earth like sulfide and oxysulfide coatings which inhibit wetting. Also described therein are conventional materials for containment vessels, including graphite, refractory metals, oxides, and fluorides. U.S. Pat. No. 4,363,995 to Crawford et al describes metal oxide or metal sulfide coatings. U.S. Pat. No. 4,876,725 to Furukawa et al describes high density sintered articles of silicon carbide. U.S. Pat. No. 3,890,140 to Asbury describes an aluminum titanate crucible for molten uranium.

SUMMARY OF THE INVENTION

Accordingly, it is an object of the invention to provide improved refractory materials and articles with high resistance to molten metals, molten salts, and high temperature corrosive environments, and materials that can be tailored to have desirable thermal and electrical properties for specific process requirements.

The invention is a class of refractory ceramic and composite materials that are used to form refractory articles, or as coatings for refractory articles, comprising nitrides, carbides, mixed nitrides and oxides, mixed carbides and oxides, oxycarbides, and oxynitrides of Group IVB metals hi selected from Hf, Zr, and Ti; nitrides, mixed nitrides and oxides, and oxynitrides of Group IIA metals selected from Be, Mg, Ca, Sr, and Ba, alone or combined or reacted with the above Group IVB metal nitrides, Group IVB metal oxides, Group IVB metal carbides, Group IVB mixed nitrides and oxides, Group IVB mixed oxides and carbides, Group IVB oxycarbides, or Group IVB oxynitrides to form composite materials; and nitrides, mixed nitrides and oxides, and oxynitrides of Group IIIB metals selected from Sc, Y, and the lanthanides La through Lu, alone or combined or reacted with the above Group IVB refractory materials or Group IIA refractory materials to form composite materials; or a combination of nitrides, ternary or quaternary oxides, mixed nitrides and oxides, mixed oxides and carbides, oxycarbides, and oxynitrides of the above Group IVB, Group IIA, and Group IIIB metals. Thus the refractory materials of the invention encompass nitrides, carbides, ternary and quaternary oxides, nitride/oxide mixtures, oxide/carbide mixtures, oxycarbides, and oxynitrides of the Group IVB, IIA, and IIIB and lanthanide metals, and mixtures and composites thereof. The invention encompasses both stoichiometric and sub-stoichiometric materials. Further, the invention includes the refractory articles formed of, or coated with, these refractory materials.

DETAILED DESCRIPTION OF THE INVENTION

Figure 1:
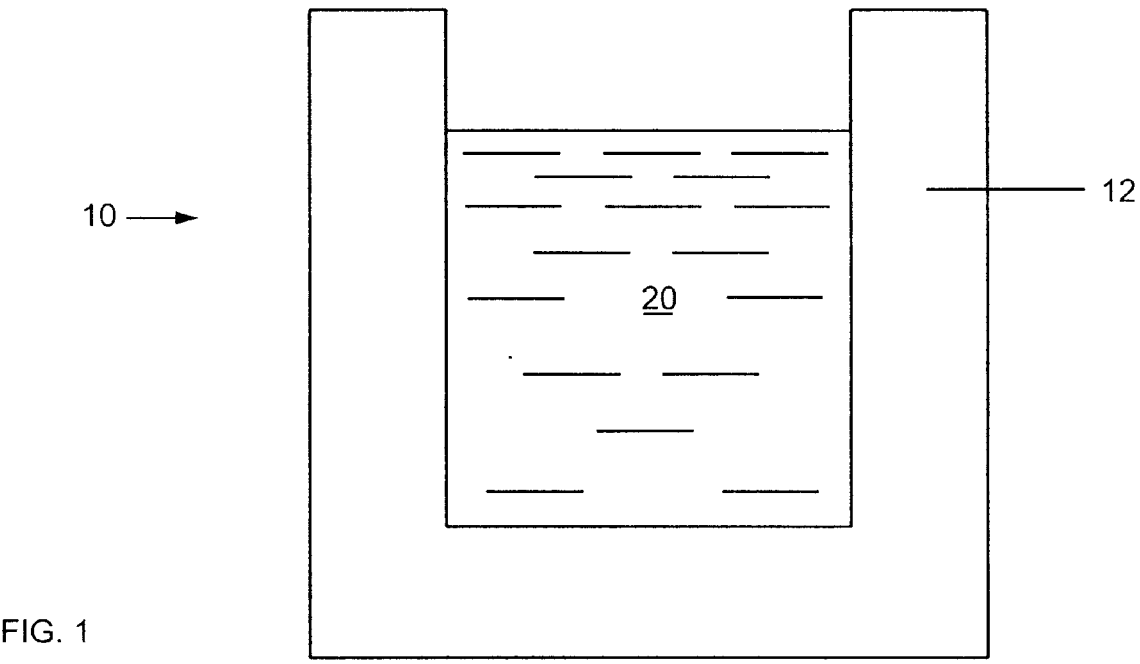
FIG. 1 is a sectional view of a crucible, mold, or containment vessel made entirely of the refractory materials.

According to the invention, these refractory ceramic and composite materials can be engineered and produced to provide a high degree of resistance to molten metals, molten salts, corrosive environments, and modified for desirable thermal, electrical, and other properties. The refractory materials of the invention comprise: 1) Group IVB metal (M=Hf, Zr, or Ti) nitrides ($M_xN_y$), Group IVB carbides ($M_xC_w$), mixtures of Group IVB metal nitrides and Group IVB metal oxides ($M_xN_y$:$M_xO_z$), mixtures of Group IVB metal carbides and Group IVB metal oxides ($M_xC_w$:$M_xO_z$), Group IVB metal oxycarbides ($M_xC_wO_z$), and Group IVB metal oxynitrides ($M_xN_yO_z$) 2) Group IIA metal (M'=Be, Mg, Ca, Sr, or Ba) nitrides ($M'_xN_y$), mixtures of Group IIA metal nitrides and Group IIA metal oxides ($M'_x$:$N_y$:M'O), and Group IIA metal oxynitrides ($M'_xN_yO_z$). These Group IIA compounds can be selectively combined or reacted with compounds from the above Group IVB refractory materials to form composites with binary, ternary, quaternary, solid-solution, or multiple compound phases and stoichiometries ($M_{x1}$,$M'_{x2}N_y$, MM'$O_z$, $M_{x1}M'_{x2}C_w$, $M_{x1}M'_{x2}N_yO_z$) 3) Group IIIB metal (M"=Sc, Y, and lanthanides La through Lu) nitrides ($M"_xN_y$), mixtures of Group IIIB metal nitrides and Group IIIB metal oxides ($M"_xN_y$:$M"_xO_z$), and Group IIIB metal oxynitrides ($M"_xN_yO_z$). These Group IIIB metal nitrides, Group IIIB metal oxides, Group IIIB metal nitride/oxide mixtures, or Group IIIB metal oxynitrides can be combined or reacted with the above Group IVB or Group IIA refractory materials to form composites with binary, ternary, quaternary, solid-solution, or multiple compound phases and stoichiometries. 4) Composites consisting of compounds from the above Group IVB, IIA, and IIIB refractory materials. All of these refractory materials are encompassed by the general formula $M_{x1}M'_{x2}M"_{x3}N_yC_wO_z$ where each of x1, x2, x3, w, y, z $\geq$ 0.

More specifically, the refractory materials include Group IVB metal nitrides having a general formula $M_xN_y$ where M is Hf, Zr, or Ti, and N is nitrogen. Metal nitrides having at least 54 atomic percent metal and no more than 46 atomic percent nitrogen, are preferred. Illustrative materials include $Hf_2N$, $Hf_3N_2$, $Hf_4N_3$, and sub-stoichiometric compositions ($HfN_{1-y}$). By comparison the normal stoichiometry for hafnium nitride is HfN. The refractory materials also include Group IVB metal carbides having a general formula $M_xC_w$ where M is Hf, Zr, or Ti, and C is carbon. Illustrative materials include HfC and sub-stoichiometric compositions such as $HfC_{0.88}$. The refractory materials also include mixtures of Group IVB metal nitrides plus Group IVB metal oxides with a general formula $M_xN_y$:$MO_z$ where M is Hf, Zr, or Ti, N is nitrogen and O is oxygen. Metal nitride rich mixtures are preferred, i.e., metal nitrides comprising at least 50 mole percent of the mixture. Illustrative composite materials range from $Hf_xN_y$:$HfO_2$ to $Hf_xN_y$+small concentrations of $HfO_2$. The refractory materials also include mixtures of Group IVB metal carbides plus Group IVB metal oxides with a general formula $M_xC_w$:$MO_z$ where M is Hf, Zr, or Ti, C is carbon and O is oxygen. The refractory materials also include Group IVB metal oxycarbides with a general formula $M_xC_wO_z$ where M is Hf, Zr, or Ti. Illustrative materials include from HfOC to $HfO_2C$. The refractory materials also include Group IVB metal oxynitrides with a general formula $M_xC_wO_z$ where M is Hf, Zr, or Ti. Oxynitrides having at least 33.4 atomic percent metal and no more than 66.6 atomic percent of nitrogen and oxygen, are preferred. Illustrative materials range from $HfN_{0.25}O_{0.25}$ to HfNO.

More specifically, the refractory materials also include Group IIA metal nitrides having the general formula $M'_xN_y$ where M' is Be, Mg, Ca, Sr, or Ba, and N is nitrogen. Metal nitrides having at least 56 atomic percent metal and no more than 44 atomic percent nitrogen, are preferred. Illustrative materials include $Ca_2N$, $Ca_3N_2$, and $Ca_4N_3$. The refractory materials also include mixtures of Group IIA metal nitrides plus Group IIA metal oxides with a general formula $M'_xN'_y$:M'O where M' is Be, Mg, Ca, Sr, or Ba, N is nitrogen, and O is oxygen. Metal oxide rich mixtures are preferred, i.e., metal oxides comprising at least 50 mole percent of the mixture. Illustrative composite materials range from CaO:$Ca_3N_2$ to CaO+small concentrations of $Ca_3N_2$. The refractory materials also include Group IIA metal oxynitrides with a general formula $M'_xN_yO_z$ where M' is Be, Mg, Ca, Sr, or Ba. Oxynitrides having at least 50 atomic percent metal and no more than 50 atomic percent of nitrogen and oxygen, are preferred. Illustrative materials range from $CaN_{0.25}O_{0.25}$ to $CaN_{0.50}O_{0.50}$. The refractory materials also include compounds of the Group IVB refractory materials reacted with the Group IIA refractory materials to form ternary ceramic compounds, e.g., $HfCaO_3$, $HfSrO_3$, $HfBaO_3$, and particularly sub-stoichiometric ternary compounds, e.g. $HfCaO_{3-z}$, or composites consisting of mixtures of the Group IVB refractory materials and the Group IIA refractory materials, e.g., $M_xN_y$+M'O= $Hf_2N$:CaO.

More specifically, the refractory materials also include Group IIIB, including lanthanide, metal nitrides having the general formula $M"_xN_y$ where M" is Sc, Y, or the lanthanides La through Lu, and N is nitrogen. Metal rich nitrides (x $\geq$ y) are preferred, i.e., nitrides having at least 50 atomic percent metal and no more than 50 atomic percent nitrogen. Illustrative materials include ScN, YN, LaN, CeN, DyN, TbN, HoN, and ErN. The refractory materials also include mixtures of Group IIIB metal nitrides plus Group IIIB metal oxides with a general formula $M"_xN_y$:$M"_xO_z$ where M" is Sc, Y, or the lanthanides La through Lu, N is nitrogen, and O is oxygen. Metal oxide rich mixtures are preferred, i.e., metal oxides comprising at least 50 mole percent of the mixture. Illustrative composite materials range from $Dy_2O_3$:$D_yN$ to $Dy_2O_3$+small concentrations of DyN. The refractory materials also include Group IIIB metal oxynitrides with a general formula $M"_xN_yO_z$ where M" is Sc, Y, or the lanthanides La through Lu. Oxynitrides having at least 33.4 atomic percent metal and no more than 66.6 atomic percent of nitrogen and oxygen, are preferred. Illustrative materials range from $DyN_{0.25}O_{0.25}$ to $Dy_2N_{0.50}O_{2.50}$.

The refractory materials also include compounds of Group IVB or Group IIA refractory materials reacted with the Group IIIB refractory materials to form solid-solution or ternary ceramic materials, e.g., $Hf_2N$:ErN, $Hf_2N$:$HfO_2$:$Y_2O_3$, and $Dy_2CaO_4$, particularly sub-stoichiometric ternary compounds, e.g. $Dy_2CaO_{4-z}$, $Er_2SrO_{4-z}$, $HfY_2O_{5-z}$, and composites consisting of mixtures of the Group IVB refractory materials, Group IIA refractory materials, and Group refractory materials, e.g., $M_xN_y$:M'O:$M"_2O_3$, etc. These materials would be selected based upon the requirements of the application and mixed according to the properties provided by the individual compound constituents, i.e., corrosion resistance, thermal conductivity or resistivity, or electrical conductivity or resistivity.

These refractory materials can be made by a variety of different techniques, including but not limited to high temperature vacuum processing, powder reaction and metallic reduction processing, liquid-phase sintering processing, reactive gas processing, and conventional sintering.

Using vacuum processing technology, pure nitride materials having normal stoichiometry, are heated in high vacuum to remove nitrogen from the compound to produce a metal rich nitride stoichiometry. Using powder reaction technology, pure nitride powder and pure metal powder are mixed and heated to react and produce a metal rich nitride product; or pure oxide powders are mixed with small amounts of carbon powder, formed into an article and sintered to react and densify a sub-stoichiometric compound material; or oxide compound powders are mixed together, pressed into a form, and heated to their reaction temperature to form ternary compounds and composite materials. Using metallic reduction technology, pure ceramic and pure metal are heated in controlled atmospheres to reduce the ceramic to metal rich phases. Similarly, metals can be treated by reactive gas processes in a high temperature furnace or by combustion synthesis, in a nitrogen, or a nitrogen plus oxygen atmosphere to produce nitrides or oxynitrides. The ceramics and composites can also be made by high temperature sintering of the mixed and pressed powders.

Some examples of these methods include:

1. Vacuum processing technology

A. Nitrides: pure HfN powder or ceramic can be converted, entirely or partially, by heating at high temperatures (e.g. $\geq 2000°$ C.) in high vacuum (e.g. P$\leq$vapor pressure or$\leq 10^{-5}$ torr) to remove nitrogen and produce the phases described below:

$2HfN-N---> Hf_2N$ $3HfN-N---> Hf_3N_2$ $4HfN-N---> Hf_2N_3$

2. Powder sintering or reaction process technology:

A. Nitrides: pure HfN powder is mixed with Hf metal powder, or HfN ceramic is placed in contact with Hf metal, and heated to high temperature (e.g. >2000° C.) in a controlled atmosphere to produce:

$HfN+Hf---> Hf_2N$ $2HfN+Hf---> Hf_3N_2$ $3HfN+Hf---> Hf_4N_3$

B. Nitrides:oxides, and oxynitrides: Nitride powders are mixed with oxide powders, and heated to high temperature (e.g. >2000° C.) in a controlled atmosphere to produce:

$HfN+HfO_2---> HfN:HfO_2---> Hf_xN_yO_z$ $Hf_xN_y+HfO_2+CaO---> Hf_xCa_xN_yO_z$ $Hf_xN_y+SrO+Dy_2O_3+DyN---> Hf_{x1}Sr_{x2}Dy_{x3}N_yO_z$

C. Oxide compounds and composites: multiple pure oxide powders are mixed together, formed into an article, and heated to high temperature (e.g. 2000° C. to 2650° C.) and reacted in a controlled atmosphere furnace to produce:

$HfO_2+CaO---> HfCaO_3$ $HfO_2+SrO---> HfSrO_3$ $Dy_2O_3+CaO---> Dy_2CaO_4$ $HfO_2+CaO+La_2O_3---> Hf_{x1}Ca_{x2}La_{x3}O_z$

D. Sub-stoichiometric ternary oxides and oxycarbides: Carbon powder is mixed with selected oxide powders, formed into a shape, and sintered at high temperatures (e.g. $\geq 2000°$ C.), to reaction form such compositions:

$CaHfO_3+_{0.2}C--> CaHfO_{2.8}+_{0.2}CO$ ($\geq 2250°$ C.)

$CaO+HfO_2+_{0.2}C--> CaHfO_{2.8}+_{0.2}CO$ ($\geq 2250°$ C.)

$SrEr_2O_4+_{0.5}C--\geq SrEr_2O_{3.5}+_{0.5}CO$ ($\geq 2100°$ C.)

$SrO+Er_2O_3+_{0.5}C--\geq SrEr_2O_{3.5}+_{0.5}CO$ ($\geq 2100°$ C.)

$HfO_2Y_2O_3+_{0.75}C--> HfY_2O_{4.25}+_{0.75}CO$ ($\geq 2250°$ C.)

$HfO_2+_{0.4}C--> HfO_{1.8}C_{0.2}+_{0.2}CO$ ($\geq 2250°$ C.)

3. Reactive gas processing technology

A. Nitrides, oxides, or oxynitrides can be produced by heating in a furnace to high temperatures (e.g. 1000° C. to 2200° C.), or by igniting pure metals in a reactive gas atmosphere, (e.g. nitrogen, oxygen, or nitrogen and oxygen):

$xHf+yN_2---> Hf_xN_y$ $xHf+zO_2---> Hf_xO_z$ $xHf+yN_2+zO_2---> Hf_xN_yO_z$

B. Oxynitrides: pure metal nitride powders or ceramics are heated to high temperatures (e.g. $\geq 2000°$ C.) in a controlled atmosphere with a partial pressure of oxygen (such that provided by $H_2/H_2O$) to oxidize the metal nitrides to produce:

$Hf_xN_y+pO_2---> Hf_xN_yO_z$

4. Conventional powder sintering technologies can be used to make complex compounds or composites of the materials described herein by first using thermodynamics and ceramic phase diagrams as preliminary theoretical guidelines to establish the necessary process variable parameters like composition, temperature, pressure, atmosphere, and time at temperature, and then by employing the proper equipment utilizing the theoretical guidelines.

The materials of the invention have applications for metallurgical and thermochemical processing technologies including extraction, refining, and casting of reactive metals, and waste treatment technologies. These materials can be engineered and modified to have specific properties for particular applications. In particular, these materials can be used in applications that require resistance to molten metals including the Group IVB metals Hf, Zr, Ti (where the $Hf_xN_y$ and sub-stoichiometric ternary oxide materials have been demonstrated to be highly resistant to molten Ti, Zr, and stainless-steel alloys); actinide metals U and Pu; lanthanide metals (rare earth metals); Group VB metals V and Nb, Group VIB metals Cr and Mo; Group IIA metals, particularly Be; and ferrous metals. These materials can also be used in applications that require resistance to molten salts, particularly Group IA halides, Group IIA halides, actinide halides, and lanthanide halides. These materials can also be used in applications that require erosion resistance and resistance to high temperature corrosive environments. These materials can also be used a susceptors in an induction field.

Preferred applications are refractory articles, including crucibles, molds, containment vessels, probes, tubes, stirrers, tools, furnace liners, bricks, and mortar. These articles can be made entirely of the nitride, oxide, nitride:oxide, or oxynitride ceramics or composites, or these materials may be applied as protective coatings on other host materials. These articles, made of or coated with the above described refractory materials, form a part of the invention.

These materials in the powder form can be used to form a paint which can be applied by hand-brushing or by spraying on other articles, or by dipping articles into a slurry of the paint and then sintering to form a protective coating. A paint can be made by combining these refractory ceramic powders in a slurry with a carrier and binder agent, e.g. butyl acetate liquid with about 1 to 3 weight percent nitrocellulose binder, or other liquid carriers with cellulosic binders. The paint is then applied to objects or articles, the liquids and binder agents are removed (evaporated or decomposed) by slow heating to about 500° C. in a low pressure vacuum, and then the coating is high temperature sintered into place at temperatures typically above 1800° C.

Other procedures to apply these materials as protective coatings can be utilized such as pack cementation, plasma spraying techniques, physical vapor deposition techniques, or chemical vapor deposition techniques.

Figure 2:
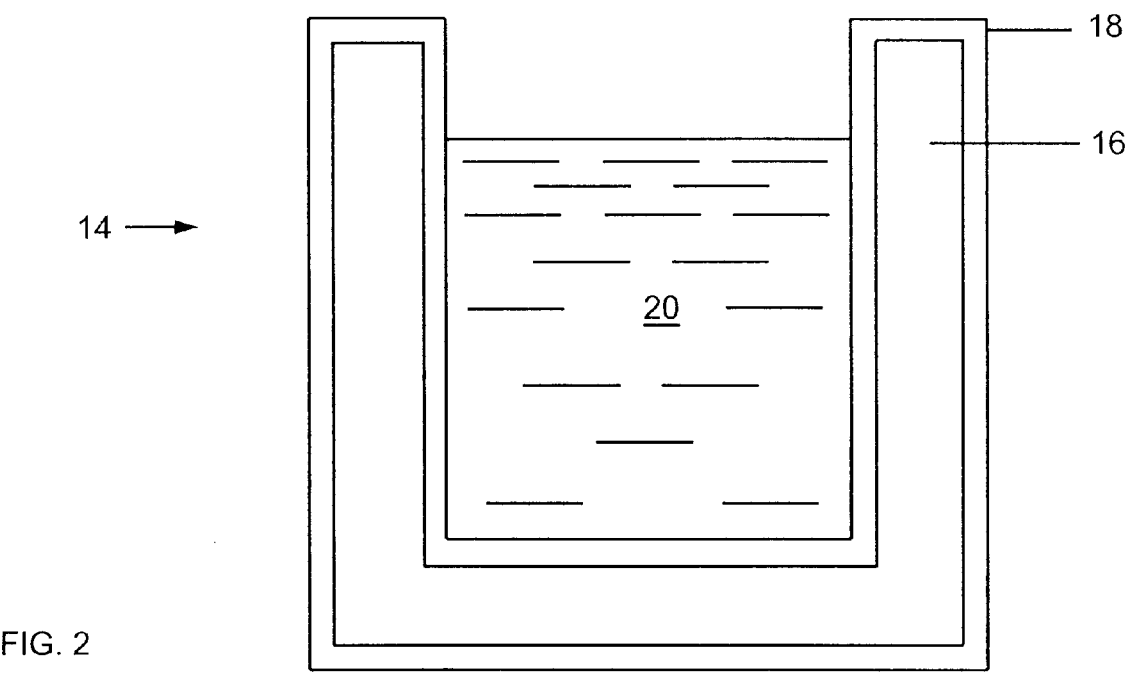
FIG. 2 is a sectional view of an alternate crucible, mold, or containment vessel having an external surface of the refractory materials.

A crucible, mold, or containment vessel according to the invention is shown in FIG. 1. The crucible, mold, or containment vessel 10 is formed of a shaped body 12 which is shown with a molten metal or molten salt 20 contained therein. The crucible, mold, or containment vessel of FIG. 1 is formed entirely of the refractory metal nitrides, carbides, oxides, or metal oxynitrides and metal oxides, metal oxycarbides, mixed metal nitrides and metal oxides, or metal oxynitrides. An alternate crucible, mold, or containment vessel 14 shown in FIG. 2 has an external surface or coating 18 of the refractory metal nitrides, carbides, oxides, mixed metal carbides and oxides, metal oxycarbides, mixed metal nitrides and metal oxides, or metal oxynitrides (e.g. $Hf_xN_yO_z$), and an internal body 16 of other materials (e.g. Ta). Other refractory articles, according to the invention, can also be formed of a shaped body or substrate made of the refractory material or made of another host material and coated with the refractory material. Thus the invention includes all refractory articles having at least a surface thereof formed of the disclosed refractory materials.

Changes and modifications in the specifically described embodiments can be carried out without departing from the scope of the invention which is intended to be limited only in scope of the appended claims.

The invention claimed is:

1. A refractory material comprising ternary or quaternary oxides having the formula $M_{x1}M'_{x2}M''_{x3}O_z$, where M is Hf, Zr, or Ti, M' is Be, Mg, Ca, Sr, or Ba, M" is Sc, Y, or a lanthanide metal La through Lu, O is oxygen, and x1>0, x2 and x3≧0 but x2+x3≠0, and z>0, and having a sub-stoichiometric atomic ratio.

2. A refractory material of claim 1 wherein x3=0, comprising ternary oxides having the formula $M_xM'_{x2}O_z$, where M is a Group IVB metal selected from Hf, Zr, and Ti, and M' is a Group IIA metal selected from Be, Mg, Ca, Sr, and Ba, and O is oxygen.

3. A refractory material of claim 1 wherein x2=0, comprising ternary oxides having the formula $M_{x1}M''_{x3}O_z$, where M is a Group IVB metal selected from Hf, Zr, and Ti, M" is a Group IIIB metal selected from Sc, Y, and lanthanide metals La through Lu, and O is oxygen.

4. A refractory material comprising oxycarbides having the formula $M_{x1}M'_{x2}M''_{x3}C_wO_z$, where M is Hf, Zr, or Ti, M' is Be, Mg, Ca, Sr, or Ba, M" is Sc, Y, or a lanthanide metal La through Lu, C is carbon, O is oxygen, and x1, x2, x3≧0 but x1+x2+x3≠0, and both w,z>0.

5. An article of manufacture comprising a shaped body having at least a surface thereof formed of a refractory material comprising carbides, reacted ternary and quaternary oxides, mixed carbides and oxides, and oxycarbides, of group IVB metals selected from Hf, Zr, and Ti, Group IIA metals selected from Be, Mg, Ca, Sr, and Ba, and Group IIIB metals selected from Sc, Y, and lanthanides La through Lu, and mixtures and composites thereof.

6. The article of claim 5 wherein the shaped body is formed substantially entirely of the refractory material.

7. The article of claim 5 wherein the shaped body is formed of a host material and a coating of the refractory material on the host material.

8. The article of claim 5 wherein the article is selected from crucibles, molds, containment vessels, tubes, probes, stirrers, tools, furnace liners, refractory bricks and mortar.

9. The article of claim 5 for use in containment of or protection from molten metals and molten salts.

10. The article of claim 5 for use in containment of or protection from molten reactive metals selected from Ti, Zr, Hf, V, Nb, Ta, and Be; molten lanthanide metals; molten actinide metals; or molten salts selected from alkali halide salts, alkaline earth halide salts, actinide halide salts, or lanthanide halide salts.

11. The article of claim 5 wherein the refractory material comprises one or more materials having the formula $M_{x1}M'_{x2}M''_{x3}C_wO_z$, where M is Hf, Zr, or Ti, M' is Be, Mg, Ca, Sr, or Ba, M" is Sc, Y, or a lanthanide metal La through Lu, C is carbon, O is oxygen, and each of x1, x2, x3, w, z≧0 but x1+x2+x3≠0 and w+z≠0, and at most only one of x1, x2, x3=0 if w=0.

12. The article of claim 11 wherein the refractory material has the formula $M_{x1}C_wO_z$ where M is Hf, Zr, or Ti, and w>0, and z≧0.

13. The article of claim 11 having the formula $M_{x1}C_w:MO_2$.

14. The article of claim 11 wherein the refractory material has the formula $M_{x1}M'_{x2}O_z$ where M is Hf, Zr, or Ti, and M' is Be, Mg, Ca, Sr, or Ba, and O is oxygen.

15. The article of claim 14 wherein the refractory material has a sub-stoichiometric composition.

16. The article of claim 6 wherein the refractory material has the formula $M_{x1}M'_{x2}M''_{x3}C_wO_z$ where M is Hf, Zr, or Ti, M' is Be, Mg, Ca, Sr, or Ba, M" is Sc, Y, and lanthanide metals La through Lu, C is carbon, O is oxygen, and x1>0, x2 and x3≧0, and w and z≧0 but w+z≠0, and x2+x3≠0 if w=0.

17. The article of claim 16 wherein the refractory material has a sub-stoichiometric composition.

18. The article of claim 11 wherein the refractory material has the formula $M_{x1}M''_{x3}O_z$ where M is Hf, Zr, or Ti, and M" is Sc, Y, and lanthanide metals La through Lu, and O is oxygen.

19. The article of claim 18 wherein the refractory material has a sub-stoichiometric composition.

20. The article of claim 18 for use in containment of or protection from molten metals and molten salts.

21. The article of claim 18 for use in containment of or protection from molten reactive metals selected from Ti, Zr, Hf, V, Nb, Ta, and Be; molten lanthanide metals; molten actinide metals; or molten salts selected from alkali halide salts, alkaline earth halide salts, actinide halide salts, or lanthanide halide salts.

* * * * *